…

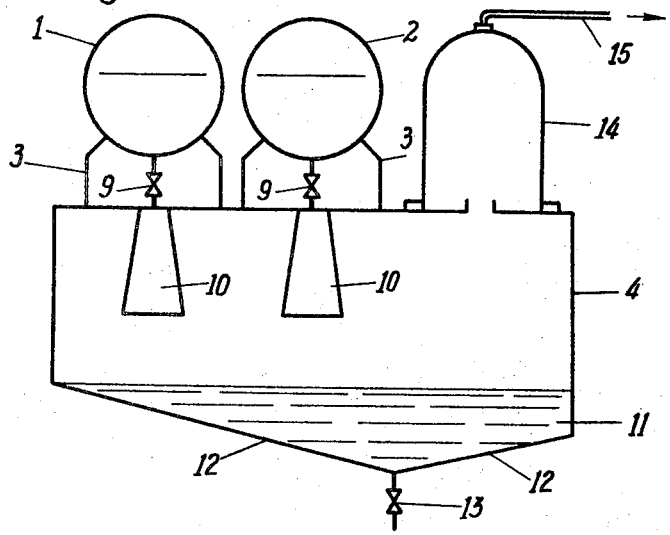
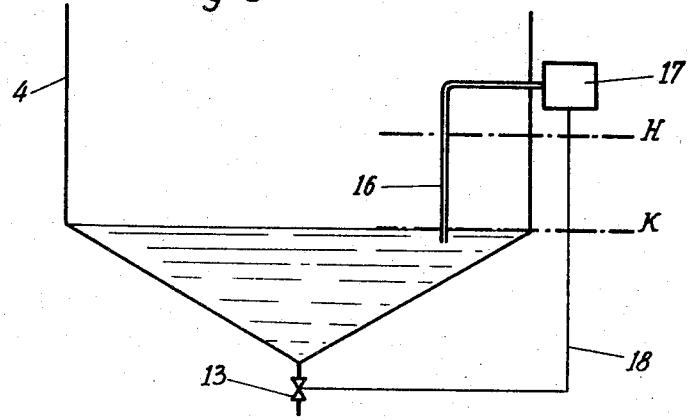
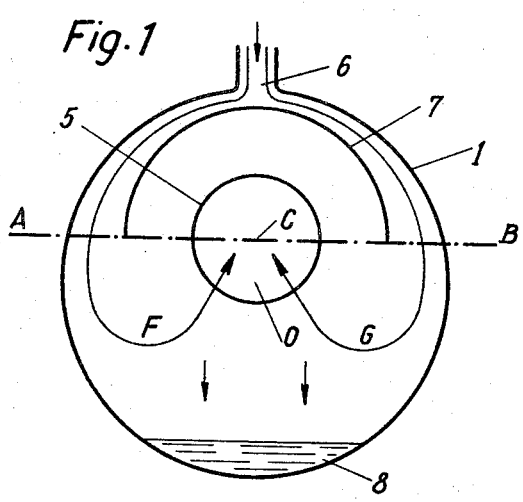

United States Patent Office 3,404,781
Patented Oct. 8, 1968

3,404,781
DEVICES FOR THE FILTRATION
OF ALL LIQUIDS
Robert Eugene Saint Andre, 34 Ave. du General Leclerc,
Limoges Haute-Vienne, France
Filed Aug. 31, 1965, Ser. No. 484,052
Claims priority, application France, Nov. 18, 1964,
995,308
1 Claim. (Cl. 210—248)

This invention relates to improvements made in devices for the filtration of all liquids and comprising in particular multiple filtration units which contain one or a number of filter elements and which are mounted above a settling tank, wherein the cleaning of clogged filter elements is performed by circulating a clean liquid in countercurrent flow and the cleaning effluent which is discharged from said filtration units is conveyed to said settling tank.

A first improvement consists in that the filter element is disposed horizontally and preferably off-center relative to the axis of the filtration unit, and a deflector mounted above said filter element in concentric relation thereto stops approximately on the horizontal plane which passes through the axis of said filter element. The inflow of liquid to be filtered takes place through the top portion of the filtration unit, the object of the deflector being on the one hand to ensure uniform distribution and low velocity of circulation of the liquid to be filtered and, on the other hand, to prevent liquids from coming directly into contact with the filter element.

By virtue of its shape, the deflector causes the liquid to follow a path at a decreasing velocity with a change of direction in such a manner as to assist the decantation of solid and liquid substances in suspension.

The filtration units can be mounted by means of a suitable frame on a settling tank which permits the recovery of fluid utilized in the countercurrent cleaning process.

The cleaning effluent which is discharged from the filtration units is conveyed to the settling tank and penetrates into said tank, for example, through spray cones so as to deposit impurities at the bottom of the tank and so as to prevent said impurities from mixing with the product which has already been decanted.

In the case in which the decantation device is employed in moving machines such as boats, a second improvement consists in mounting above the settling tank a dome having a useful volume which is greater than the volume of liquid removed at each withdrawal from said settling tank.

An overflow pipe opens into the top of the dome and returns the decanted liquid, for example, to a main storage tank.

The presence of said dome makes it possible to maintain the settling tank constantly full so as to prevent any agitation and emulsion of the solid or liquid substances decanted which might otherwise occur during such movements of a boat as rolling, pitching or the like.

It is possible by this means to dispense with the need for antirolling baffles for which provision is usually made in boats, and the effectiveness of which is variable according to the level of liquid within the tank.

A third improvement consists in the use of an automatic device for the evacuation of impurities, sludges and water which have settled at the bottom of the tank.

The products just referred to are evacuated through a valve which is operated in any suitable manner, for example by means of an electric control system.

The automatic device consists of a vertical probe forming a condenser plate which is associated with a detection device, for example an electronic device, which controls the valve either directly or indirectly.

Said valve is opened when the level of decanted products reaches a predetermined height and closes again only when the level of said decanted products has fallen to another predetermined height, the distance between these two levels being substantial if necessary.

The presence of said automatic device is intended to prevent the uncontrolled opening and closure of the valve when fluctuations of the decanted products occur as a result of movements of a boat between the two predetermined levels.

Finally, a substantial improvement consists in supplying the filter from a volumetric pump of large size which operates at a low speed in such a manner as to prevent any agitation of products circulating through the pump which would result in a relatively stable emulsion, thus making it very difficult to ensure effective separation of the phases which are brought together. With the same object in view, the volume rate of flow generated by the pump must be chosen as close as possible to the volume rate of flow to be obtained, in such a manner as to avoid any need to make use of a by-pass or pressure-relieving device.

One form of embodiment of the invention is illustrated by way of example in the accompanying drawings, in which:

FIG. 1 is a cross-section taken through a filtration unit;

FIG. 2 is a view of two filtration units mounted above a settling tank;

FIG. 3 is a diagrammatic view of the automatic device for evacuating products which have settled at the bottom of the tank.

The filtration device to which this invention applies consists of a certain number of filtration units such as, for example, two horizontal units 1 and 2 having curved walls and which are each mounted by means of a suitable frame 3 on a settling tank 4. Inside each filtration unit are mounted one or a number of filter elements 5 which are circular in cross section.

It is assumed that the cleaning of a clogged filter 5 is effected by means of a delivery of clean liquid in countercurrent flow, this being achieved by associating the units 1 and 2 during operation. The settling tank 4 then permits the recovery of the fluid which has been employed for cleaning by the countercurrent flow process.

In accordance with a first improvement of the invention, the filter element 5 is mounted horizontally and preferably displaced off-center relative to the axis 0 of one of the units 1 or 2 in the direction of the inlet 6 for the admission of the liquid to be filtered. Moreover, said filter element 5 is surmounted by a deflector 7 which is concentric with the filter element 5 and which stops approximately on the horizontal plane A–B which passes through the axis C of the filter element 5. By virtue of its shape, the deflector causes the liquid to follow the path indicated by the arrows F and G in FIG. 1 at a decreasing velocity and with a change of direction, thereby assisting the decantation of solid and liquid substances in suspension 8.

The cleaning effluent is discharged from the filtration units through evacuation valves 9 and is directed into the settling tank 4, then penetrates into said tank, for example, through spray cones 10, so as to deposit the impurities at 11 at the bottom of the tank and so as to prevent said impurities from mixing with the product which has already been decanted. The tank 4 is preferably provided with a bottom formed by inclined surfaces 12 and the impurities 11 can be evacuated through a drain valve 13.

In the case in which the filtration device is employed in moving machines such as boats, a second improvement consists in mounting above the tank 4 a dome 14, the useful volume of which is larger than the volume of the liquid removed at each withdrawal from the settling tank, as shown in FIG. 2. An overflow pipe 15 has its opening in the top of the dome 14 and returns the decanted liquid to a main storage tank, for example.

The presence of the dome 14 makes is possible to maintain the tank 4 constantly full, thereby preventing agitation and emulsion of decanted solid or liquid substances at the time of movements of the boat and thus facilitating the subsequent separation of these different substances.

A third improvement consists in the use of an automatic device for the evacuation of impurities, sludges and water which have settled at the bottom of the tank 4. These products are evacuated through the valve 13 which is controlled in any suitable manner (as shown in FIG. 3).

The automatic device consists of a vertical probe 16 forming a condenser plate associated with a detection device which is shown diagrammatically at 17. Said detection device can be an electronic system which controls the valve 13 either directly or indirectly, for example by way of a connection 18.

Said valve 13 is opened when the level of decanted products reaches a predetermined height H and closes again only when the level of said products has fallen to another predetermined height K, the distance between these two levels H and K being relatively substantial if necessary.

It is thus intended by this means to prevent the uncontrolled opening and closure of the valve 13 whenever fluctuations of the decanted products take place between the two predetermined levels H and K as a result of movements of a boat.

Finally, one improvement in the operation of the filtration device is obtained by supplying said device from a volumetric pump of large size which operates at a low speed in such a manner as to prevent any agitation of the products within the pump.

A number of different detail modifications can be made in the filtration device which has been described both in regard to the nature, number and dimensions of its components and in regard to the mode of connection of these latter without thereby departing either from the scope or the spirit of the invention.

What I claim is:
1. A device for the filtration of a liquid to be filtered, said device comprising at least one horizontally disposed filtration unit having a curved wall and receiving the liquid to be filtered from which waste products are discharged, a settling tank on which said filtration unit is mounted, discharge valve means between said filtration unit and said settling tank, said settling tank receiving through said discharge valve means the waste products discharged from the filtration unit which settle at the bottom of the tank, said settling tank including a valve at the bottom thereof for withdrawing waste products from the tank, said settling tank further including a dome mounted above said tank and communicating therewith, said dome having an overflow pipe in communication with the top of said dome, said filtration unit including a top portion provided with an inlet for the admission into the unit of liquid to be filtered, at least one filter element of circular cross section mounted horizontally within said filtration unit and disposed with its center axis above the center horizontal axis of said unit, and a semi-circular deflector mounted within said unit with its center axis coaxial with the center of said filter element, said deflector disposed in a spaced apart relationship between the upper portion of said element and the curved wall of said unit and substantially covering that portion of the filter element above its horizontal axis, the eccentricity of the axis of said deflector with respect to said unit providing an ever increasing spacing between said deflector and said unit from said inlet to the bottom of said deflector, whereby the velocity of the liquid passing through said inlet into said unit is reduced and the direction of the liquid before striking the filter is changed, thereby preventing said liquid from flowing directly downwardly onto said filter element.

References Cited
UNITED STATES PATENTS

| | | | |
|---|---|---|---|
| 123,663 | 2/1872 | Anderson | 210—540 |
| 1,032,240 | 7/1912 | Port et al. | 210—306 |
| 1,431,411 | 10/1922 | Morel et al. | 210—306 |
| 2,585,878 | 2/1952 | Tryon | 210—540 |
| 2,747,736 | 5/1956 | Mobley | 210—540 X |
| 2,933,191 | 4/1960 | Rohr | 210—540 X |
| 2,942,733 | 6/1960 | Thompson | 210—540 X |
| 3,131,145 | 4/1964 | Rosaen | 210—261 X |
| 3,249,230 | 5/1966 | Clement | 210—261 X |
| 3,262,573 | 7/1966 | Schutte | 210—112 X |

REUBEN FRIEDMAN, *Primary Examiner.*

J. ADEE, *Assistant Examiner.*